US010528132B1

(12) United States Patent
Hassani et al.

(10) Patent No.: US 10,528,132 B1
(45) Date of Patent: Jan. 7, 2020

(54) GAZE DETECTION OF OCCUPANTS FOR VEHICLE DISPLAYS

(71) Applicant: Ford Global Technologies, LLC, Dearborn, MI (US)

(72) Inventors: Ali Hassani, Ann Arbor, MI (US); Erick Michael Lavoie, Dearborn, MI (US); Mark Larry, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/030,342

(22) Filed: Jul. 9, 2018

(51) Int. Cl.
*G09G 5/10* (2006.01)
*G06F 3/01* (2006.01)
*G09G 5/14* (2006.01)
*G09G 3/3208* (2016.01)
*G06F 3/14* (2006.01)
*G02B 27/28* (2006.01)
*G02B 27/00* (2006.01)
*B60K 35/00* (2006.01)
*G06T 7/70* (2017.01)

(52) U.S. Cl.
CPC .............. *G06F 3/013* (2013.01); *B60K 35/00* (2013.01); *G02B 27/0093* (2013.01); *G02B 27/28* (2013.01); *G06F 3/1423* (2013.01); *G09G 3/3208* (2013.01); *G09G 5/14* (2013.01); *B60K 2370/1868* (2019.05); *B60K 2370/25* (2019.05); *B60K 2370/52* (2019.05); *B60K 2370/736* (2019.05); *G06T 7/70* (2017.01); *G09G 2320/068* (2013.01); *G09G 2354/00* (2013.01)

(58) Field of Classification Search
USPC ......................................................... 345/158
See application file for complete search history.

(56) References Cited

U.S. PATENT DOCUMENTS

| 3,582,197 A * | 6/1971 | Eaves ................... G03B 15/08 352/38 |
| 9,688,146 B2 | 6/2017 | Kim et al. |
| 2005/0190935 A1 | 9/2005 | Sakamoto |

(Continued)

FOREIGN PATENT DOCUMENTS

| CN | 105966247 A | 9/2016 |
| EP | 2218606 B1 | 9/2011 |
| WO | WO 2013104377 A1 | 7/2013 |

OTHER PUBLICATIONS

VW Digital Cockpit Concept Has a 3D Instrument Cluster, Jan. 2017, 6 pages.

*Primary Examiner* — Tony O Davis
(74) *Attorney, Agent, or Firm* — Frank Lollo; Eversheds Sutherland (US) LLP

(57) ABSTRACT

Method and apparatus are disclosed for gaze detection of occupants for vehicle displays. An example vehicle includes a panoramic display including polarized displays. The example vehicle also includes a controller to identify a primary operator interface and a primary passenger interface and detect, via one or more cameras, an operator gaze and a passenger gaze. The controller also is to present the primary operator interface to an operator via one of the polarized displays corresponding with the operator gaze and present the primary passenger interface to a passenger via one of the polarized displays corresponding with the passenger gaze.

20 Claims, 5 Drawing Sheets

(56) References Cited

U.S. PATENT DOCUMENTS

| | | | |
|---|---|---|---|
| 2007/0205963 A1* | 9/2007 | Piccionelli | G09F 9/00 345/7 |
| 2011/0123961 A1* | 5/2011 | Staplin | G09B 9/052 434/64 |
| 2011/0242134 A1* | 10/2011 | Miller | G06T 19/006 345/633 |
| 2013/0307771 A1* | 11/2013 | Parker | G06F 3/013 345/158 |
| 2014/0123030 A1* | 5/2014 | Kozloski | H04L 12/1827 715/753 |
| 2015/0312404 A1* | 10/2015 | Abramson | H04W 4/027 455/418 |
| 2016/0082888 A1* | 3/2016 | Kothari | B60R 1/00 348/148 |
| 2016/0191794 A1* | 6/2016 | Varonos | H04N 5/2253 348/36 |
| 2016/0191795 A1* | 6/2016 | Han | G06T 3/4038 348/36 |
| 2016/0196098 A1 | 7/2016 | Roth et al. | |
| 2016/0209916 A1* | 7/2016 | Sendai | G02B 27/0172 |
| 2016/0355133 A1* | 12/2016 | Kim | G02B 27/01 |
| 2017/0013188 A1* | 1/2017 | Kothari | B60R 11/0235 |
| 2017/0072800 A1* | 3/2017 | Fujita | B60K 35/00 |
| 2017/0169616 A1* | 6/2017 | Wiley | G06T 19/006 |
| 2017/0184870 A1* | 6/2017 | Li | B60K 35/00 |
| 2017/0282717 A1* | 10/2017 | Jang | B60K 37/06 |
| 2017/0323482 A1* | 11/2017 | Coup | A63G 7/00 |
| 2017/0337901 A1* | 11/2017 | Maltsev | B60K 35/00 |
| 2017/0358141 A1* | 12/2017 | Stafford | G02B 27/017 |
| 2017/0364148 A1 | 12/2017 | Kim | |
| 2018/0005449 A1* | 1/2018 | Wallner | G06T 15/04 |
| 2018/0032300 A1 | 2/2018 | Singh et al. | |
| 2018/0090002 A1* | 3/2018 | Arita | B60K 35/00 |
| 2018/0118224 A1* | 5/2018 | Arita | B60H 1/00564 |
| 2018/0119922 A1* | 5/2018 | Yamaguchi | G02B 5/3041 |
| 2018/0146121 A1* | 5/2018 | Hensler | G06F 3/012 |
| 2018/0197334 A1* | 7/2018 | Kitazono | G06T 19/003 |
| 2018/0232195 A1* | 8/2018 | Jaegal | G06F 3/14 |
| 2018/0326305 A1* | 11/2018 | Watanabe | A63F 13/57 |
| 2018/0326310 A1* | 11/2018 | Watanabe | A63F 13/92 |
| 2018/0352272 A1* | 12/2018 | Breitenfeld | G06F 3/011 |
| 2019/0045117 A1* | 2/2019 | Maranville | B60H 1/00021 |
| 2019/0049736 A1* | 2/2019 | Tanriover | B60K 35/00 |
| 2019/0056782 A1* | 2/2019 | Rao | A61B 3/113 |
| 2019/0070961 A1* | 3/2019 | Kim | G02B 27/144 |
| 2019/0168586 A1* | 6/2019 | Paepcke | B60J 3/04 |

\* cited by examiner

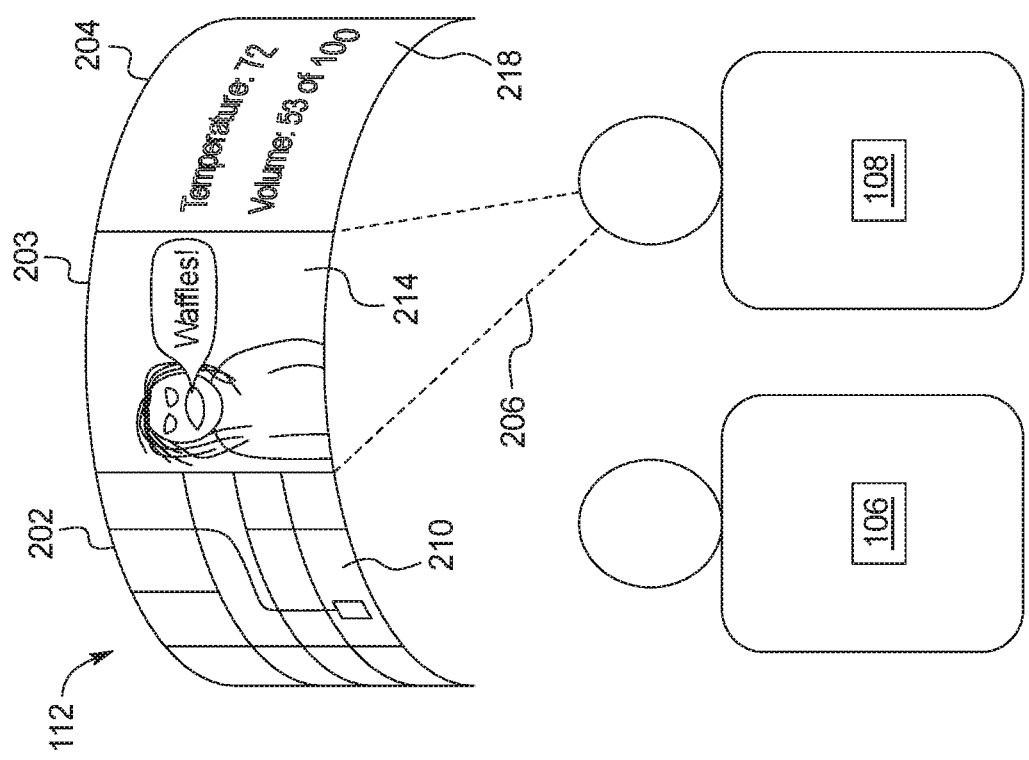
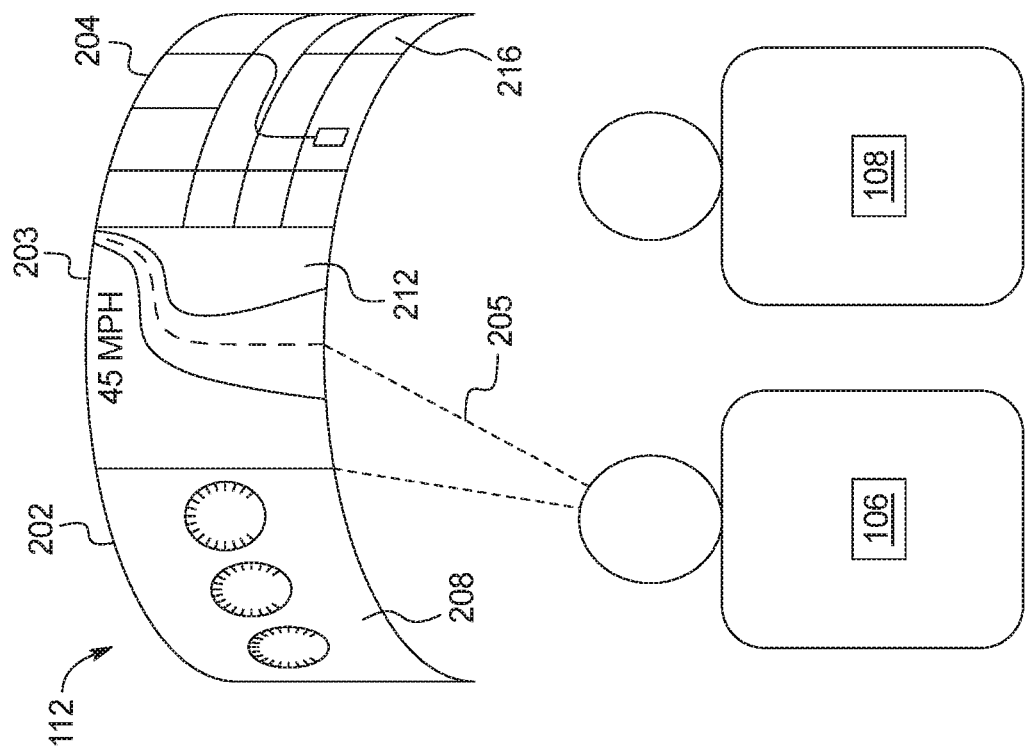

GAZE DETECTION OF OCCUPANTS FOR VEHICLE DISPLAYS

TECHNICAL FIELD

The present disclosure generally relates to vehicle displays and, more specifically, to gaze detection of occupants for vehicle displays.

BACKGROUND

Typically, vehicles include center consoles and dashboards. Oftentimes, a center console and/or a dashboard of a vehicle include output devices (e.g., meters, lights, etc.) that present information to occupants (e.g., a driver, a passenger) of the vehicle and input devices (e.g., buttons, knobs, etc.) that receive information from the occupants. In some instance, such output devices include one or more displays that present information to the occupants. The information presented via the display(s) may facilitate the driver in operating the vehicle and/or enable the occupants to monitor one or more instruments (e.g., a HVAC system, a radio, etc.) and/or settings (e.g., driver settings, temperature settings, etc.) of the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for gaze detection of occupants for vehicle displays. An example disclosed vehicle includes a panoramic display including polarized displays. The example disclosed vehicle also includes a controller to identify a primary operator interface and a primary passenger interface and detect, via one or more cameras, an operator gaze and a passenger gaze. The controller also is to present the primary operator interface to an operator via one of the polarized displays corresponding with the operator gaze and present the primary passenger interface to a passenger via one of the polarized displays corresponding with the passenger gaze.

An example disclosed method for a vehicle includes identifying, via a processor, a primary driver interface and a primary passenger interface and detecting, via one or more cameras, a driver gaze and a passenger gaze. The example disclosed method also includes presenting, via one or more of polarized displays, the primary driver interface to a driver corresponding with the driver gaze and presenting, via one or more of the polarized displays, the primary passenger interface to a passenger corresponding with the passenger gaze.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 2A depicts interfaces being presented to an operator of via a panoramic display of the vehicle of FIG. 1.

FIG. 2B depicts interfaces being presented to a passenger of via the panoramic display of FIG. 2A.

DETAILED DESCRIPTION OF EXAMPLE EMBODIMENTS

Figure 1:
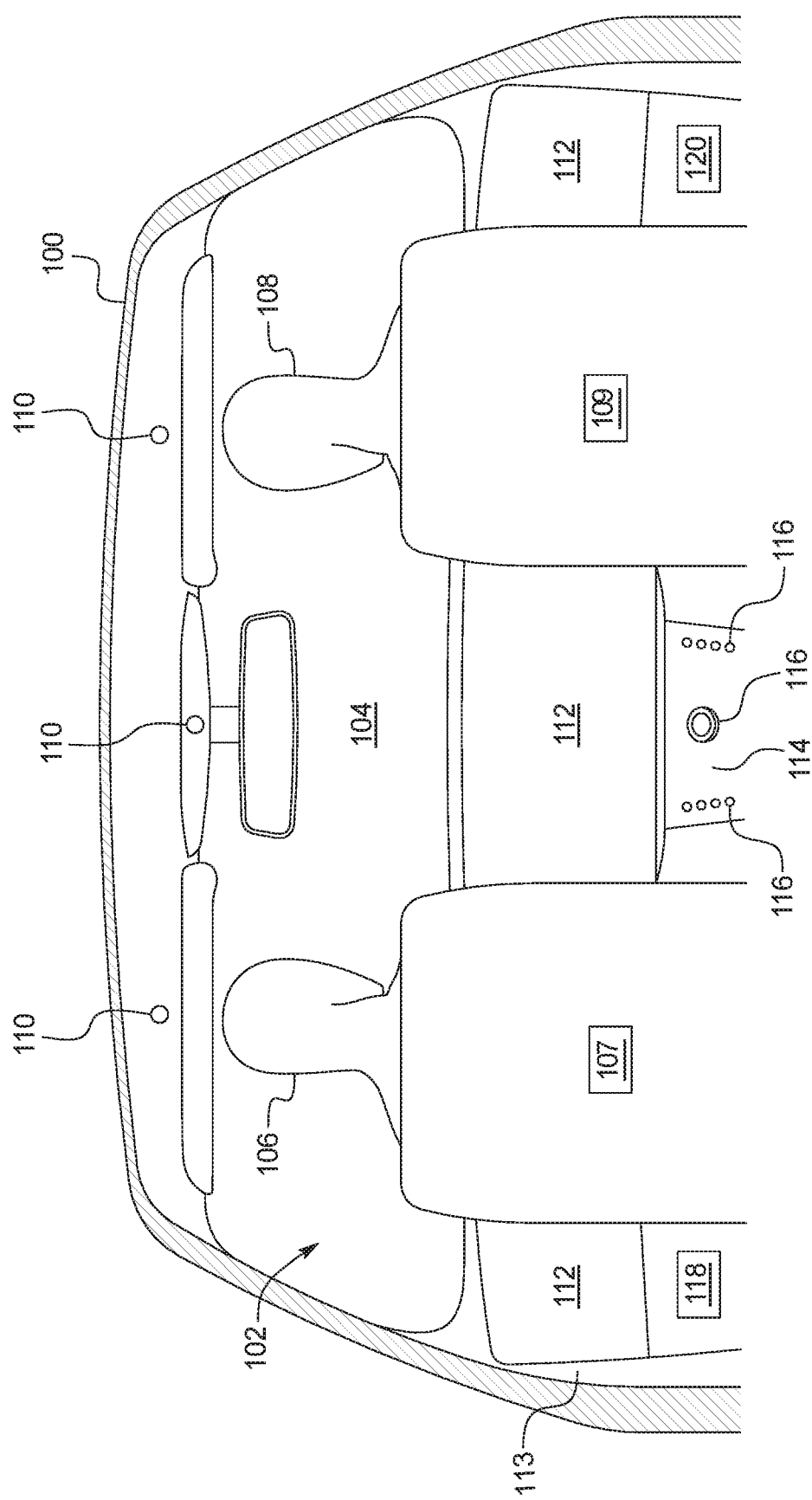
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include center consoles and dashboards. Oftentimes, a center console and/or a dashboard of a vehicle include output devices (e.g., meters, lights, etc.) that present information to occupants (e.g., a driver, a passenger) of the vehicle and input devices (e.g., buttons, knobs, etc.) that receive information from the occupants. In some instance, such output devices include one or more displays that present information to the occupants. The information presented via the display(s) may facilitate the driver in operating the vehicle and/or enable the occupants to monitor one or more instruments (e.g., a HVAC system, a radio, etc.) and/or settings (e.g., driver settings, temperature settings, etc.) of the vehicle.

In some instances, the amount of information that the operator and the passenger desire to view via the displays on the dashboard are signification, thereby potentially making it difficult to fit all of the desired information within those displays. Additionally or alternatively, the information that the operator and the passenger each desire may be different, thereby potentially making it difficult to identify which of the information is to be presented via those display and/or potentially making it difficult to fit all of the desired information within those displays.

Example methods and apparatus disclosed herein include polarized display(s) that adjust which interfaces are presented to an operator (e.g., a driver) and a passenger based on eye tracking of the operator and the passenger to enable the operator and the passenger to quickly identify information of interest within the interfaces. As used herein, a "polarized display" refers to a display that is polarized such that (1) a first image or interface is (i) viewable from a first angle relative to the display and (ii) not viewable from a second angle relative to the display and (2) a second image or interface is (i) viewable from the second angle relative to the display and (ii) not viewable from the second angle relative to the display.

Examples disclosed herein include a panoramic display within a vehicle that is formed of one or more polarized displays. The vehicle also includes a display controller to identify one or more interfaces for the operator (e.g., a primary operator interface, a secondary operator interface, a tertiary operator interface, etc.) and one or more interfaces for the passenger (e.g., a primary passenger interface, a secondary passenger interface, a tertiary passenger interface, etc.). Further, the vehicle includes one or more cameras that enable the controller to identify, via image recognition, a gaze direction of the operator and a gaze direction of the passenger. Via the polarized display(s), the controller simultaneously presents (1) the operator interface(s) to the operator based on the gaze direction of the operator and (2) the passenger interface(s) to the passenger based on the gaze direction of the passenger. For example, the controller presents (1) the primary operator interface to the operator via one of the polarized display(s) that corresponds with the operator gaze and (2) the primary passenger interface to the passenger via one of the polarized display(s) that corresponds with the passenger gaze.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a cabin 102 and a windshield 104. For example, the windshield 104 (e.g., a front windshield) enables an operator 106 (e.g., a driver) positioned at a driver seat 107 and/or a passenger 108 positioned at a passenger seat 109 within the cabin 102 to observe an area in front and/or to the side of the vehicle 100. In some examples, the windshield 104 is formed of laminated or safety glass to prevent the windshield 104 from shattering during a collision event.

As illustrated in FIG. 1, the vehicle 100 also includes one or more cameras 110. In the illustrated example, the cameras 110 are located within the cabin 102 of the vehicle 100. In other examples, there may be more or less of the cameras 110 and/or one or more of the cameras 110 may be positioned at different locations (e.g., mounted on an A-Pillar at an angle). Further, the cameras 110 are positioned and oriented to capture image(s) and/or video of the operator 106 and the passenger 108. In the illustrated example, the cameras 110 capture image(s) and/or video to enable gaze detection (sometimes referred to as eye tracking) of the operator 106 and the passenger 108. For example, the cameras 110 are positioned and oriented to capture image(s) and/or video of a face of the operator 106 and a face of the passenger 108 to enable detection of gaze directions of the operator 106 and/or the passenger 108. In some examples, one of the cameras 110 captures image(s) and/or video that enable gaze detection of both the operator 106 and the passenger 108. In other examples, one of the cameras 110 captures image(s) and/or video that enable gaze detection of the operator 106 and another of the cameras 110 captures image(s) and/or video that enable gaze detection of the passenger 108.

The vehicle 100 of the illustrated example includes a panoramic display 112 that is configured to present interface(s) to the operator 106 and the passenger 108 of the vehicle 100. In the illustrated example, the panoramic display 112 extends along a dashboard 113 of the vehicle 100. For example, the panoramic display 112 is formed of one or more monitors (e.g., (e.g., liquid crystal displays (LCD), LED displays, solid state displays, flat panel displays, curved displays, laser displays, etc.) that are coupled to and/or embedded within the dashboard 113. In other examples, the panoramic display 112 includes an organic light emitting diode (OLED) display that is coupled to and/or embedded within the windshield 104 of the vehicle 100.

In the illustrated example, the vehicle 100 also includes a center console 114. For example, the center console 114 is positioned below the panoramic display 112 between the driver seat 107 and the passenger seat 109. As illustrated in FIG. 1, the center console 114 includes one or more center console devices 116. The center console devices 116 include button(s), control knob(s), touchscreen(s), touchpad(s), and/or other input device(s) configured to receive input from the operator 106 and the passenger 108. Additionally or alternatively, the panoramic display 112 includes virtual button(s), virtual control knob(s), and/or other virtual input device(s) configured to receive input from the operator 106 and the passenger 108 (e.g., as detected using gesture recognition software based on image(s) captured by one or more of the cameras 110). For example, one or more of the center console devices 116 and/or one or more virtual input device(s) of the panoramic display 112 are configured to receive selection(s) from the operator 106 and/or passenger 108 of interface(s) that are to be presented to the operator 106 and/or passenger 108 via the panoramic display 112.

Further, the vehicle 100 of the illustrated example includes a communication module 118 that is configured to receive selection(s) from mobile device(s) of the operator 106 and/or passenger 108 regarding interface(s) that are to be presented to the operator 106 and/or passenger 108 via the panoramic display 112. The communication module 118 includes wired or wireless network interfaces to enable communication with other devices and/or external networks. For example, the other device(s) may include mobile device(s) (e.g., a smart phone, a wearable, a smart watch, a tablet, etc.) of the operator 106 and/or the passenger 108. The external network(s) may be a public network, such as the Internet; a private network, such as an intranet; or combinations thereof, and may utilize a variety of networking protocols now available or later developed including, but not limited to, TCP/IP-based networking protocols. The communication module 118 includes hardware (e.g., processors, memory, storage, antenna, etc.) and software to control the wired or wireless network interfaces. For example, the communication module 118 includes one or more communication controllers for cellular networks (e.g., Global System for Mobile Communications (GSM), Universal Mobile Telecommunications System (UMTS), Long Term Evolution (LTE), Code Division Multiple Access (CDMA)) that enable communication with device(s) of the operator 106 and/or the passenger 108. Additionally or alternatively, the communication module 118 includes a wireless personal area network (WPAN) module that is configured to wirelessly communicate with mobile device(s) of the operator 106 and/or the passenger 108 via short-range wireless communication protocol(s). For example, the communication module 118 is configured to implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Further, in some examples, the communication module 118 is configured to wirelessly communicate via Wi-Fi®, Near Field Communication (NFC), and/or any other communication protocol(s) that enable wirelessly communication with mobile device(s) of the operator 106 and/or the passenger 108.

As illustrated in FIG. 1, the vehicle 100 also includes a display controller 120. In the illustrated example, the display controller 120 controls the panoramic display 112 to present interface(s) to the operator 106 and/or the passenger 108. For example, the display controller 120 presents interface(s) to the operator 106 based on where the operator 106 is looking and presents interface(s) to the passenger 108 based on where the passenger 108. The display controller 120 detects where the operator 106 and/or the passenger 108 are looking by applying image recognition software to image(s) and/or video collected by one or more of the cameras 110. That is, the display controller 120 manages what information (e.g., data, instructions, entertainment, etc.) is presented to the operator 106 and the passenger 108 via the panoramic display 112 by monitoring respective gaze directions of the operator 106 and the passenger 108.

FIGS. 2A and 2B depict interfaces being presented simultaneously to the operator 106 and the passenger 108 via the panoramic display 112 of the vehicle 100. More specifically, FIG. 2A illustrates the panoramic display 112 presenting interfaces to the operator 106, and FIG. 2B illustrates the panoramic display 112 presenting interfaces to the passenger 108.

As illustrated in FIGS. 2A and 2B, the panoramic display 112 includes a polarized display 202 (e.g., a first polarized display), a polarized display 203 (e.g., a second polarized display), and a polarized display 204 (e.g., a third polarized display). While the panoramic display 112 of the illustrated example includes three polarized displays, the panoramic display 112 of other examples may include less (e.g., 1, 2) or more (e.g., 4, 5, etc.) polarized displays. In some examples, the number of polarized displays include in the panoramic display 112 is based upon viewing angles corresponding with the panoramic display 112. For example, the number of polarized displays included in the panoramic display 112 is selected to ensure that images are correctly displayed to the operator 106 and the passenger 108.

Further, each of the polarized displays 202, 203, 204 of the illustraed example is configured to simultaneously present (1) a first interface (e.g., a primary operator interface) that is viewable from a first relative angle (e.g., by the operator 106 positioned at the driver seat 107) and not a second relative angle (e.g., by the passenger 108 positioned at the passenger seat 109) and (2) a second interface (e.g., a primary passenger interface) that is viewable from the second relative angle and not the first relative angle. In the illustrated example, each of the polarized displays 202, 203, 204 simultaneously presents (1) an interface that is viewable by the operator 106 and not the passenger 108 and (2) another interface that is viewable by the passenger 108 and not the operator 106. For example, each of the polarized displays 202, 203, 204 includes polarized transistors, electronic polarizers, alternative lines of transistor arrays, LEDs oriented in different directions, and/or any other device(s) that enable the polarized displays 202, 203, 204 to be polarized. That is, each of the polarized displays 202, 203, 204 is polarized to enable the operator 106 and the passenger 108 to simultaneously view different content from one or more of the polarized displays 202, 203, 204 of the panoramic display 112.

In operation, the display controller 120 determines which interfaces to present via which of the polarized displays 202, 203, 204 based upon a direction of an operator gaze 205 of the operator 106 and a direction of a passenger gaze 206 of the passenger 108. For example, the display controller 120 receives image(s) and/or video that are captured by one of more of the cameras 110. In the illustrated example, the display controller 120 utilizes image recognition software to identify the direction of the operator gaze 205 and the direction of the passenger gaze 206 based upon image(s) and/or video collected by one or more of the cameras 110. For example, to identify the directions of the operator gaze 205 and the passenger gaze 206, the display controller 120 utilizes image recognition software to detect directions in which eyes of the operator 106 and eyes of the passenger 108 are looking.

Further, the display controller 120 determines which of the polarized displays 202, 203, 204 correspond with the operator gaze 205 and/or the passenger gaze 206. For example, the display controller 120 determines that the operator gaze 205 corresponds with the polarized display 202 in response to (i) determining that the operator gaze 205 is directed to the polarized display 202 or (ii) the polarized display 202 is nearest to a direction of the operator gaze 205. Alternatively, the display controller 120 determines that the operator gaze 205 corresponds with the polarized display 203 in response to determining that (i) the operator gaze 205 is directed to the polarized display 203 or (ii) the polarized display 203 is nearest to a direction of the operator gaze 205. Alternatively, the display controller 120 determines that the operator gaze 205 corresponds with the polarized display 204 in response to determining that (i) the operator gaze 205 is directed to the polarized display 204 or (ii) the polarized display 204 is nearest to a direction of the operator gaze 205. Similarly, the display controller 120 determines that the passenger gaze 206 corresponds with the polarized display 202 in response to (i) determining that the passenger gaze 206 is directed to the polarized display 202 or (ii) the polarized display 202 is nearest to a direction of passenger gaze 206. Alternatively, the display controller 120 determines that the passenger gaze 206 corresponds with the polarized display 203 in response to determining that (i) the passenger gaze 206 is directed to the polarized display 203 or (ii) the polarized display 203 is nearest to a direction of the passenger gaze 206. Alternatively, the display controller 120 determines that the passenger gaze 206 corresponds with the polarized display 204 in response to determining that (i) the passenger gaze 206 is directed to the polarized display 204 or (ii) the polarized display 204 is nearest to a direction of the passenger gaze 206.

The display controller 120 of the vehicle 100 also identifies interfaces to be presented to the operator 106 and the passenger 108 via the panoramic display 112. In some examples, the interfaces include instrument clusters, lines-of-sight, a vehicle speed, maps, directions, cabin settings, entertainment, etc.

In the illustrated example, the display controller 120 identifies a primary operator interface 208 and a primary passenger interface 210. For example, the primary operator interface 208 includes information that is currently most important to the operator 106, and the primary passenger interface 210 includes information that is most important and/or otherwise of interest to the passenger 108. In some examples, the primary operator interface 208 includes information (e.g., a line-of-sight, a vehicle speed, etc.) that facilitates the operator 106 in operating the vehicle 100. Further, in some examples, the display controller 120 prevents the primary operator interface 208 from being an entertainment interface to deter the operator 106 from being distracted while operating the vehicle 100. Additionally, in some examples, the primary operator interface 208 and the primary passenger interface 210 are the same interface. In other examples, the primary operator interface 208 is different than the primary passenger interface 210. In the illustrated example, the primary operator interface 208 includes a line-of-sight of a road in front of the vehicle 100 and a vehicle speed, and the primary passenger interface 210 includes an entertainment interface (e.g., a movie, a television show, etc.).

Further, the display controller 120 identifies the primary operator interface 208 and the primary passenger interface 210 based upon vehicle settings, user preferences, user selections, and/or other information. In some examples, the display controller 120 enables the operator 106 to select the primary operator interface 208 and enables the passenger 108 to select the primary passenger interface 210. For example, the display controller 120 is configured to receive an interface selection from the center console devices 116, mobile devices via the communication module 118, cabin microphones (e.g., microphones 518 of FIG. 5), touchscreens (e.g., the polarized displays 202, 203, 204 and/or the panoramic display 112), and/or any other input device(s).

In the illustrated example, the display controller 120 also identifies secondary and tertiary interfaces for the operator 106 and the passenger 108. For example, the display controller 120 identifies a secondary operator interface 212 for the operator 106, a secondary passenger interface 214 for the passenger 108, a tertiary operator interface 216 for the operator 106, and a tertiary passenger interface 218 for the passenger 108. In the illustrated example, the secondary operator interface 212 includes instrument clusters, the secondary passenger interface 214 includes cabin settings of the cabin 102, and the tertiary operator interface 216 and the tertiary passenger interface 218 include a map and/or directions for the vehicle 100. In some examples, the secondary operator interface 212 and/or the tertiary operator interface 216 are blank to deter the operator 106 from being distracted while operating the vehicle 100.

The display controller 120 is configured to identify the secondary operator interface 212, the secondary passenger interface 214, the tertiary operator interface 216, and/or the tertiary passenger interface 218 based upon vehicle settings, user preferences, user selections, and/or other information.

Subsequently, the display controller 120 presents the operator interfaces 208, 212, 216 and the passenger interfaces 210, 214, 218 via the polarized displays 202, 203, 204 based upon the operator gaze 205 and the passenger gaze 206. For example, the display controller 120 presents (1) the primary operator interface 208 via the polarized display 203 that corresponds with the operator gaze 205 and (2) the primary passenger interface 210 via the polarized display 203 that corresponds with the passenger gaze 206. Further, the display controller 120 presents the secondary operator interface 212, the secondary passenger interface 214, the tertiary operator interface 216, and the tertiary passenger interface 218 via the polarized displays 202, 204 that do not correspond with the operator gaze 205 and/or the passenger gaze 206. For example, the polarized display 202, which is the closest of the polarized displays 202, 204 to the operator 106 that do not correspond with the operator gaze 205, presents the secondary operator interface 212 next to the primary operator interface 208. The polarized display 204, which is the farthest of the polarized displays 202, 204 to the operator 106 that do not correspond with the operator gaze 205, presents the tertiary operator interface 216 near the primary operator interface 208. Further, the polarized display 204, which is the closest of the polarized displays 202, 204 to the passenger 108 that do not correspond with the passenger gaze 206, presents the secondary passenger interface 214 next to the primary passenger interface 210. The polarized display 202, which is the farthest of the polarized displays 202, 204 to the passenger 108 that do not correspond with the passenger gaze 206, presents the tertiary passenger interface 218 near the primary passenger interface 210.

Additionally, the display controller 120 changes which of the polarized displays 202, 203, 204 present the interfaces 208, 210, 212, 214, 216, 218 over time based upon the operator gaze 205 and the passenger gaze 206. For example, the display controller 120 changes which of the polarized displays 202, 203, 204 presents the primary operator interface 208, the secondary operator interface 212, and/or the tertiary operator interface 216 in response to detecting that the operator 106 has shifted the direction of the operator gaze 205. Additionally or alternatively, the display controller 120 changes which of the polarized displays 202, 203, 204 presents the primary passenger interface 210, the secondary passenger interface 214, and/or the tertiary passenger interface 218 in response to detecting that the passenger 108 has shifted the direction of the passenger gaze 206.

Figure 3:
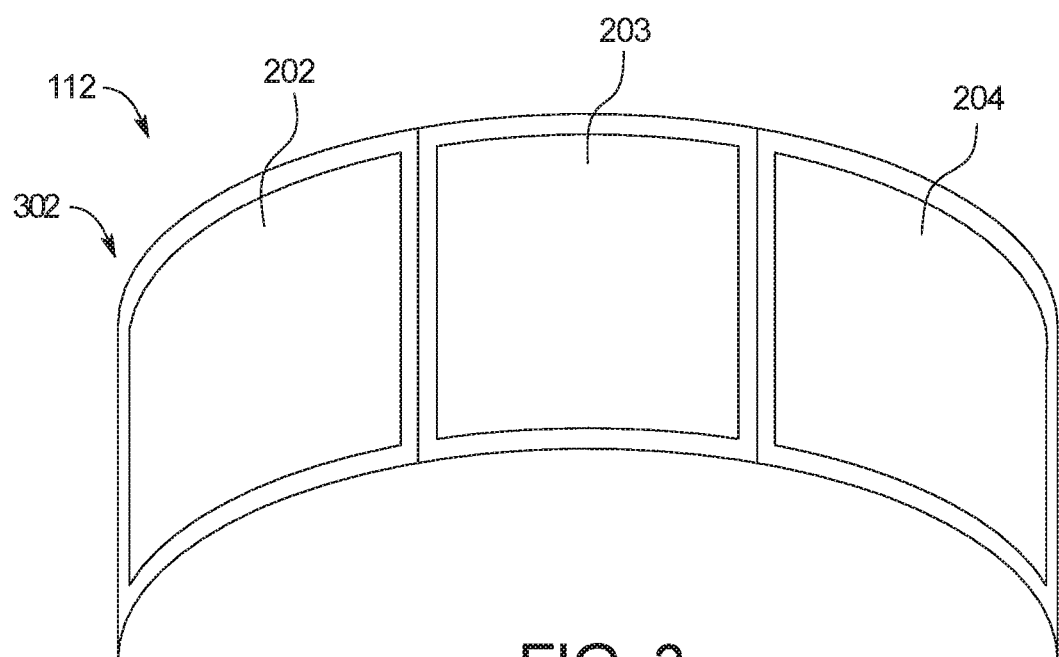
FIG. 3 illustrates an example panoramic display of the vehicle of FIG. 1.

FIG. 3 illustrates an example of the panoramic display 112 of the vehicle 100. In the illustrated example, the panoramic display 112 is formed by a plurality of monitors 302 arranged in a side-by-side manner. For example, the monitors 302 are arranged in a side-by-side manner along the dashboard 113 of the vehicle 100. Further, as illustrated in FIG. 3, each of the polarized displays 202, 203, 204 of the panoramic display 112 corresponds with one of the monitors 302.

Figure 4:
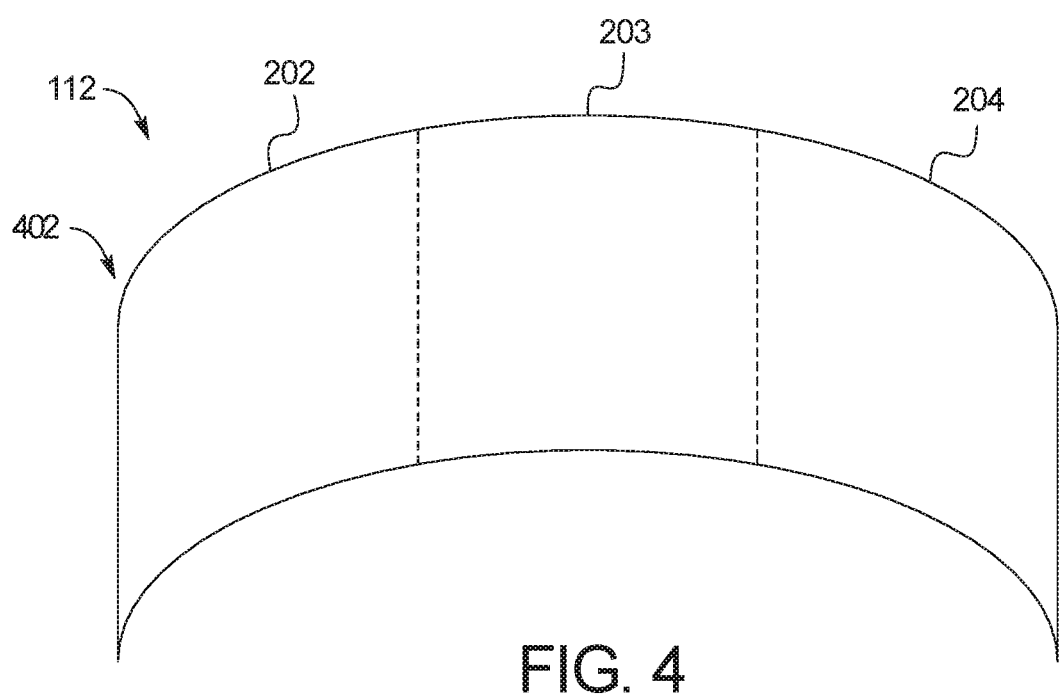
FIG. 4 illustrates another example panoramic display of the vehicle of FIG. 1.

FIG. 4 illustrates another example of the panoramic display 112 of the vehicle 100. In the illustrated example, the panoramic display 112 is formed by a single display device 402. Further, each of the polarized displays 202, 203, 204 of the panoramic display 112 corresponds with a respective predefined segment 404 of the single display device 402. For example, the single display device 402 is a single monitor that extends along the dashboard 113 in which each of polarized displays 202, 203, 204 corresponds with a predefined segment of the single monitor. Alternatively, the single display device 402 is an OLED display that extends along the windshield in which each of the polarized displays 202, 203, 204 corresponds with a respective predefined segment of the OLED display.

Figure 5:
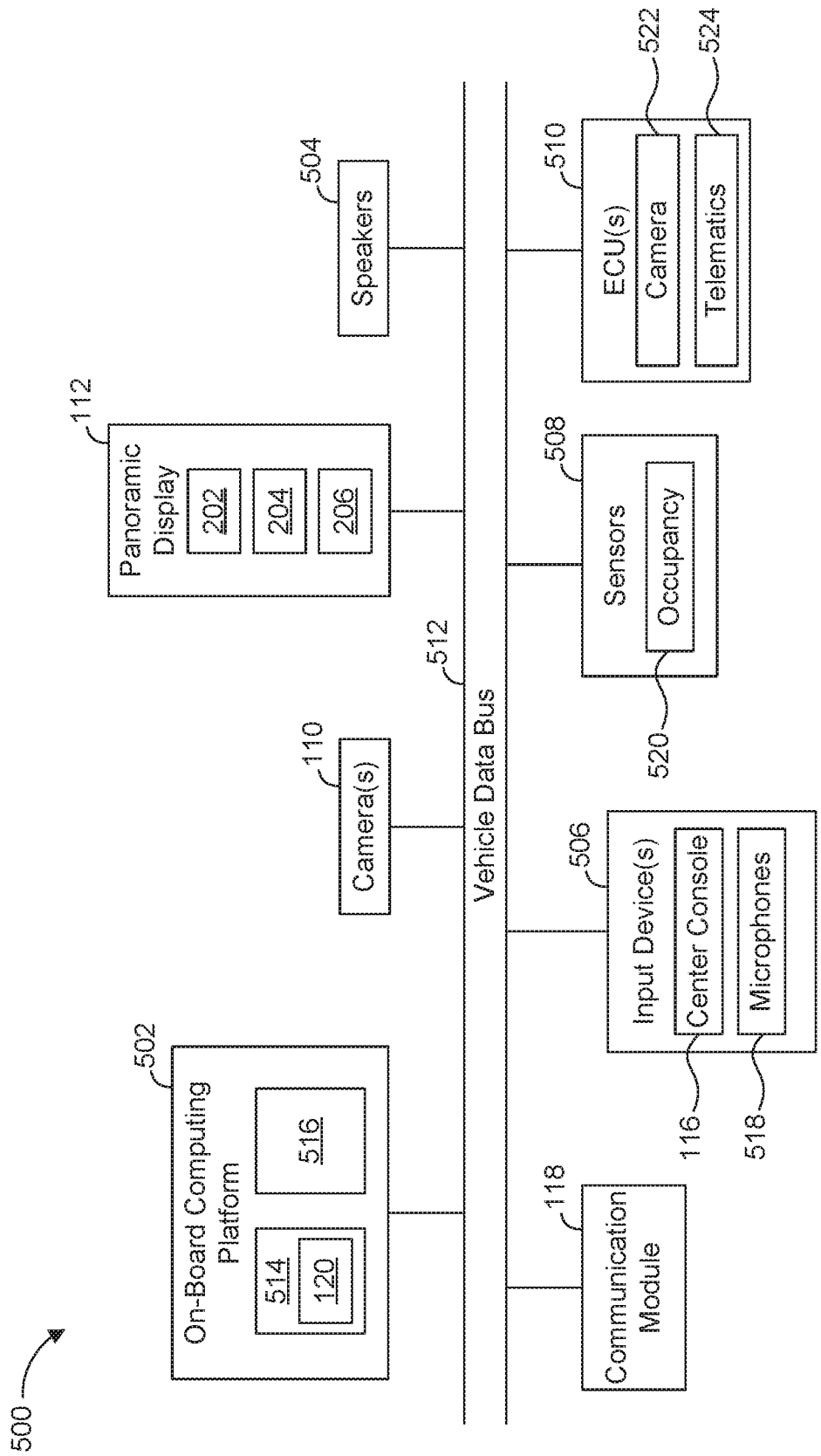
FIG. 5 is a block diagram of electronic components of the vehicle of FIG. 1.

FIG. 5 is a block diagram of electronic components 500 of the vehicle 100. As illustrated in FIG. 5, the electronic components 500 include an on-board computing platform 502, the cameras 110, the panoramic display 112, speakers 504, the communication module 118, input devices 506, sensors 508, electronic control units (ECUs) 510, and a vehicle data bus 512.

The on-board computing platform 502 includes a processor 514 (also referred to as a microcontroller unit and a controller) and memory 516. In the illustrated example, the processor 514 of the on-board computing platform 502 is structured to include the display controller 120. In other examples, the display controller 120 incorporated into another ECU with its own processor and memory. The processor 514 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 516 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 516 includes multiple kinds of memory, particularly volatile memory and non-volatile memory.

The memory 516 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 516, the computer readable medium, and/or within the processor 514 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the cameras 110 are configured to collect image(s) and/or video of the operator 106 and the passenger 108 to enable the display controller 120 to detect the gaze of the operator 106 and the gaze of the passenger 108. The panoramic display 112 is configured to simultaneously display interfaces to the operator and the passenger 108. For example, the panoramic display 112 includes one or more polarized displays (e.g., the polarized display 202, the polarized display 203, the polarized display 204) that are each configured to simultaneously present one interface that is viewable by the operator 106 (and not the passenger 108) and another interface that is viewable by the passenger 108 (and not the operator 106).

Further, the speakers 504 of the illustrated example are configured to create separate audio zones for the operator 106 and the passenger 108. That is, the speakers are configured to emit sound such that (1) audio corresponding to one or more of the operator interfaces 208, 212, 216 is heard by the operator 106 and not the passenger 108 and (2) audio corresponding to one or more of the passenger interfaces 210, 214, 218 is heard by the passenger 108 and not the operator 106. For example, to create the audio zones, audio beamforming, planar speakers embedded within seat headrests, and/or other techniques for the speakers 504 may be used.

In the illustrated example, the communication module 118 is configured to collect interface preferences from mobile device(s) of the operator 106 and/or the passenger 108. For example, the communication module 118 receives selection(s) of the primary operator interface, the secondary operator interface, the tertiary operator interface, etc. from a mobile device of the operator 106. Additionally or alternatively, the communication module 118 receives selection(s) of the primary passenger interface, the secondary passenger interface, the tertiary passenger interface, etc. from a mobile device of the passenger 108.

The input devices 506 of the vehicle 100 are configured to receive input, such as interface preferences and/or selections, from the operator 106 and the passenger 108. In the illustrated example, the input devices 506 include the center console devices 116 and one or more microphones 518. For example, the center console devices 116 include button(s), control knob(s), touchscreen(s), touchpad(s), and/or other device(s) configured to receive input from the operator 106 and the passenger 108. The microphones 518 are configured to receive audio input signals from the operator 106 and the passenger 108.

The sensors 508 are arranged in and/or around the vehicle 100 to monitor properties of the vehicle 100 and/or an environment in which the vehicle 100 is located. One or more of the sensors 508 may be mounted to measure properties around an exterior of the vehicle 100. Additionally or alternatively, one or more of the sensors 508 may be mounted inside a cabin of the vehicle 100 or in a body of the vehicle 100 (e.g., an engine compartment, wheel wells, etc.) to measure properties in an interior of the vehicle 100. For example, the sensors 508 include accelerometers, odometers, tachometers, pitch and yaw sensors, wheel speed sensors, tire pressure sensors, biometric sensors and/or sensors of any other suitable type.

In the illustrated example, the sensors 508 include occupancy sensors 520. For example, the occupancy sensors 520 include weight sensors, pressure sensors, seatbelt sensors, infrared sensors, proximity sensors (e.g., radar sensors, lidar sensors, ultrasonic sensors), motion detection sensors, and/or other sensors configured to detect when a vehicle seat is occupied by an occupant. For example, one of the occupancy sensors 520 detect when the operator 106 is seated in the driver seat 107, and another of the occupancy sensors 520 detect when the passenger 108 is seated in the passenger seat 109. In some examples, the display controller 120 is configured to (1) display operator interfaces via the panoramic display 112 only when one of the occupancy sensors 520 detects that the operator 106 is positioned in the driver seat 107 and/or (2) display passenger interfaces via the panoramic display 112 only when one of the occupancy sensors 520 detects that the passenger 108 is positioned in the passenger seat 109.

The ECUs 510 monitor and control the subsystems of the vehicle 100. For example, the ECUs 510 are discrete sets of electronics that include their own circuit(s) (e.g., integrated circuits, microprocessors, memory, storage, etc.) and firmware, sensors, actuators, and/or mounting hardware. The ECUs 510 communicate and exchange information via a vehicle data bus (e.g., the vehicle data bus 512). Additionally, the ECUs 510 may communicate properties (e.g., status of the ECUs 510, sensor readings, control state, error and diagnostic codes, etc.) to and/or receive requests from each other. For example, the vehicle 100 may have dozens of the ECUs 510 that are positioned in various locations around the vehicle 100 and are communicatively coupled by the vehicle data bus 512.

In the illustrated example, the ECUs 510 include a camera module 522 and a telematics control unit 524. For example, the camera module 522 controls the cameras 110 to collect image(s) and/or video of the operator 106 and the passenger 108 that are utilized by the display controller 120 to detect the operator gaze and/or the passenger gaze. Additionally, in some examples, the camera module 522 controls one or more cameras configured to collect image(s) and/or video of a surrounding area of the environment that are presented to the operator 106 and/or the passenger 108 via the panoramic display 112. The telematics control unit 524 controls tracking of the vehicle 100, for example, utilizing data received by a global positioning (GPS) receiver of the vehicle 100. For example, the telematics control unit 524 tracks the position of the vehicle 100 to enable map(s), direction(s), and/or other location-based information to be presented to the operator 106 and/or the passenger 108 via the panoramic display 112.

The vehicle data bus 512 communicatively couples the cameras 110, the panoramic display 112, the communication module 118, the on-board computing platform 502, the speakers 504, the input devices 506, the sensors 508, and the ECUs 510. In some examples, the vehicle data bus 512 includes one or more data buses. The vehicle data bus 512 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
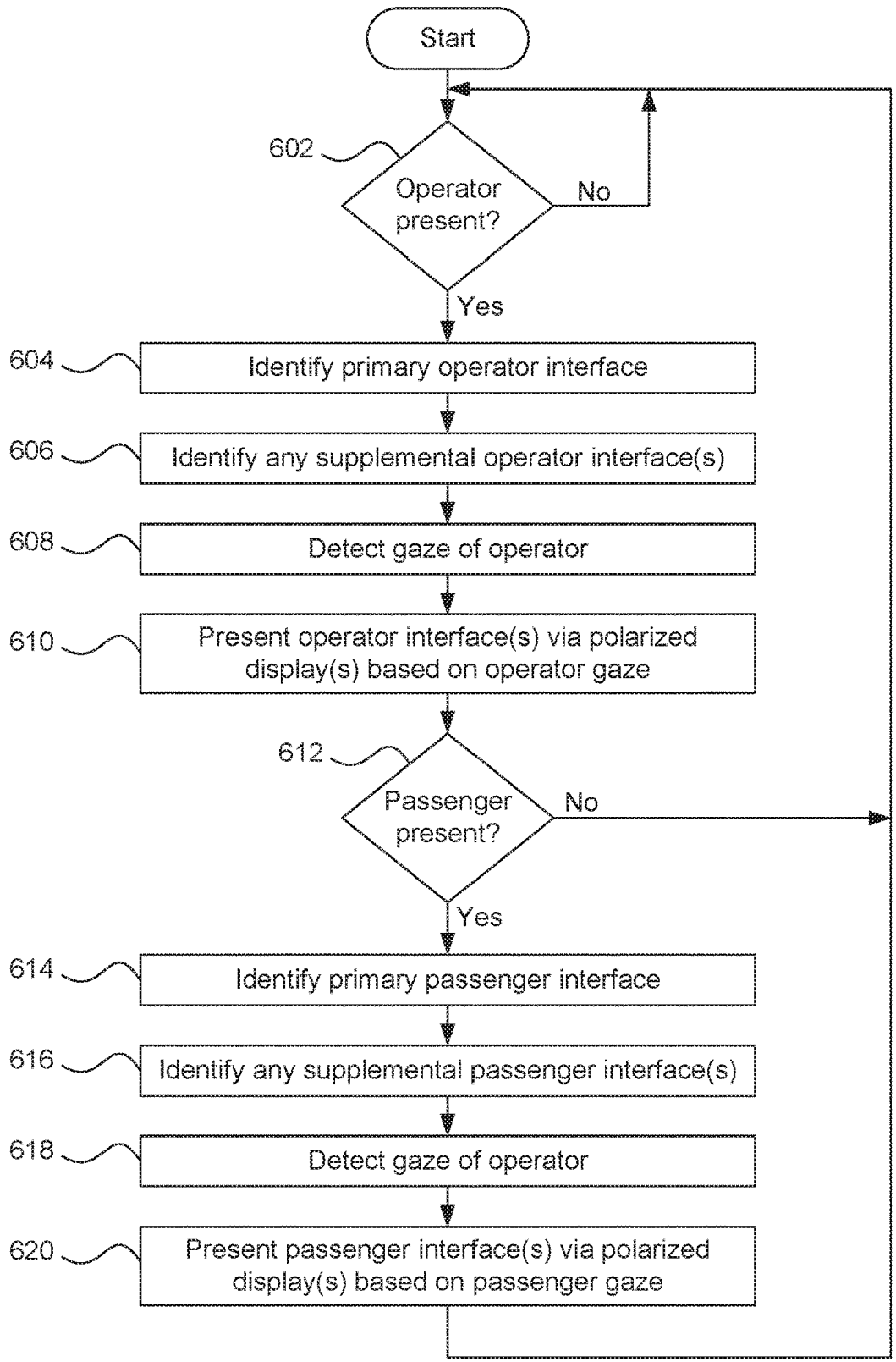
FIG. 6 is a flowchart for presenting interfaces via a panoramic display based on occupant gaze directions in accordance with the teachings herein.

FIG. 6 is a flowchart of an example method 600 to present interfaces via a panoramic display of a vehicle based on occupant gaze directions. The flowchart of FIG. 6 is representative of machine readable instructions that are stored in memory (such as the memory 516 of FIG. 5) and include one or more programs which, when executed by a processor (such as the processor 514 of FIG. 5), cause the vehicle 100 to implement the example display controller 120 of FIGS. 1 and 5. While the example program is described with reference to the flowchart illustrated in FIG. 6, many other methods of implementing the example display controller 120 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the display controller 120 determines whether the operator 106 is present within the cabin 102 of the vehicle 100. For example, the display controller 120 detects the presence of the operator 106 based upon image(s) collected by one or more of the cameras 110 and/or data collected by one of the occupancy sensors 520. In response to the display controller 120 determining that the operator 106 is not present, the method 600 remains at block 602. Otherwise, in response to the display controller 120 determining that the operator 106 is present, the method 600 proceeds to block 604.

At block 604, the display controller 120 identifies the primary operator interface 208 for the operator 106. At block 606, the display controller 120 identifies any supplemental operator interface(s) for the operator 106. For example, the display controller 120 identifies the secondary operator interface 212, the tertiary operator interface 216, etc. In some examples, the display controller 120 identifies the operator interface(s) based upon selection(s) made by the operator 106. Further, in some examples, the display controller 120 prevents entertainment interface(s) from being identified as an operator interface.

At block 608, the display controller 120 detects the operator gaze 205 of the operator 106. For example, the display controller 120 utilizes image recognition software to identify a direction of the operator gaze 205 based upon image(s) collected by one or more of the cameras 110. At block 610, the display controller 120 presents the identified operator interface(s) to the operator 106 via one or more of the polarized displays 202, 203, 204 of the panoramic display 112 based on the operator gaze 205. For example, in response to detecting that the operator gaze 205 is directed to and/or near (e.g., slightly above through the windshield 104) one of the polarized displays 202, 203, 204, the display controller 120 presents the primary operator interface 208 to the operator 106 via the corresponding one of the polarized displays 202, 203, 204 and presents any supplemental interfaces (e.g., the secondary operator interface 212, the tertiary operator interface 216) to the operator 106 via the other of the polarized displays 202, 203, 204.

At block 612, the display controller 120 determines whether the passenger 108 is present within the cabin 102 of the vehicle 100. For example, the display controller 120 detects the presence of the passenger 108 based upon image(s) collected by one or more of the cameras 110 and/or data collected by one of the occupancy sensors 520. In response to the display controller 120 determining that the passenger 108 is not present, the method 600 returns to block 602. Otherwise, in response to the display controller 120 determining that the passenger 108 is present, the method 600 proceeds to block 614.

At block 614, the display controller 120 identifies the primary passenger interface 210 for the passenger 108. At block 616, the display controller 120 identifies any supplemental passenger interface(s) for the passenger 108. For example, the display controller 120 identifies the secondary passenger interface 214, the tertiary passenger interface 218, etc. In some examples, the display controller 120 identifies the operator interface(s) based upon selection(s) made by the operator 106.

At block 618, the display controller 120 detects the passenger gaze 206 of the passenger 108. For example, the display controller 120 utilizes image recognition software to identify a direction of the passenger gaze 206 based upon image(s) collected by one or more of the cameras 110. At block 620, the display controller 120 presents the identified passenger interface(s) to the passenger 108 via one or more of the polarized displays 202, 203, 204 of the panoramic display 112 based on the passenger gaze 206. That is, panoramic display 112 simultaneously presents the operator interface(s) to the operator 106 and the passenger interface(s) to the passenger 108 via one or more of the polarized displays 202, 203, 204. For example, in response to detecting that the passenger gaze 206 is directed to and/or near (e.g., slightly above through the windshield 104) one of the polarized displays 202, 203, 204, the display controller 120 presents the primary passenger interface 210 to the passenger 108 via the corresponding one of the polarized displays 202, 203, 204 and presents any supplemental interfaces (e.g., the secondary passenger interface 214, the tertiary passenger interface 218) to the passenger 108 via the other of the polarized displays 202, 203, 204.

An example disclosed vehicle includes a panoramic display including polarized displays. The example disclosed vehicle also includes a controller to identify a primary operator interface and a primary passenger interface and detect, via one or more cameras, an operator gaze and a passenger gaze. The controller also is to present the primary operator interface to an operator via one of the polarized displays corresponding with the operator gaze and present the primary passenger interface to a passenger via one of the polarized displays corresponding with the passenger gaze.

In some examples, the primary operator interface is different than the primary passenger interface. In some such examples, each of the polarized displays is configured to simultaneously present the primary operator interface to the operator and the primary passenger interface to the passenger. In some examples, each of the polarized displays is configured to simultaneously present a first interface that is viewable from a first relative angle and a second interface that is viewable from a second relative angle. In some such examples, each of the polarized displays is polarized via at least one of polarized transistors, electronic polarizers, alternative lines of transistor arrays, and LEDs oriented in different directions.

In some examples, the controller determines that the operator gaze corresponds with a first of the polarized displays when the operator gaze is directed at a first of the polarized displays. In some examples, the controller determines that the operator gaze corresponds with a first of the polarized displays when the first of the polarized displays is nearest to a direction of the operator gaze. In some examples, the controller changes which of the polarized displays present at least one of the primary operator interface and the primary passenger interface in response to at least one of the operator shifting the operator gaze and the passenger shifting the passenger gaze.

In some examples, the controller is configured to identify a secondary operator interface and a secondary passenger interface, present the secondary operator interface to the operator next to the primary operator interface, and present the secondary passenger interface to the passenger next to the primary passenger interface. In some such examples, the secondary operator interface is blank to deter the operator from being distracted.

Some examples further include a dashboard. In such examples, the panoramic display extends along the dashboard. In some such examples, the panoramic display is formed by a plurality of monitors arranged in a side-by-side manner and each of the polarized displays corresponds with one of the plurality of monitors. In some such examples, the panoramic display is formed by a single monitor that extends along the dashboard and each of the polarized displays corresponds with a respective predefined segment of the single monitor. Some such examples further include a windshield. In such examples, the panoramic display is an OLED display that extends along the dashboard.

In some examples, the controller enables the operator to select the primary operator interface and the passenger to select the primary passenger interface. In some such examples, the controller prevents the primary operator interface from being an entertainment interface. Some such examples further include one or more input devices configured to receive selections from the operator and the passenger. Some such examples further include a wireless communication module configured to receive selections of the operator and the passenger from mobile devices.

An example disclosed method for a vehicle includes identifying, via a processor, a primary driver interface and a primary passenger interface and detecting, via one or more cameras, a driver gaze and a passenger gaze. The example disclosed method also includes presenting, via one or more of polarized displays, the primary driver interface to a driver corresponding with the driver gaze and presenting, via one or more of the polarized displays, the primary passenger interface to a passenger corresponding with the passenger gaze.

Some examples further include changing which of the polarized displays present at least one of the primary driver interface and the primary passenger interface in response to detecting that at least one of shifting of the driver gaze and shifting of the passenger gaze.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a panoramic display including polarized displays;
   a controller to:
     identify a primary operator interface and a primary passenger interface;
     detect, via one or more cameras, an operator gaze and a passenger gaze;
     present the primary operator interface to an operator via one of the polarized displays corresponding with the operator gaze;
     present the primary passenger interface to a passenger via one of the polarized displays corresponding with the passenger gaze; and
   a dashboard, wherein the panoramic display extends along the dashboard.

2. The vehicle of claim 1, wherein the primary operator interface is different than the primary passenger interface.

3. The vehicle of claim 2, wherein each of the polarized displays is configured to simultaneously present the primary operator interface to the operator and the primary passenger interface to the passenger.

4. The vehicle of claim 1, wherein each of the polarized displays is configured to simultaneously present a first interface that is viewable from a first relative angle and a second interface that is viewable from a second relative angle.

5. The vehicle of claim 4, wherein each of the polarized displays is polarized via at least one of polarized transistors, electronic polarizers, alternative lines of transistor arrays, and LEDs oriented in different directions.

6. The vehicle of claim 1, wherein the controller determines that the operator gaze corresponds with a first of the polarized displays when the operator gaze is directed at a first of the polarized displays.

7. The vehicle of claim 1, wherein the controller determines that the operator gaze corresponds with a first of the polarized displays when the first of the polarized displays is nearest to a direction of the operator gaze.

8. The vehicle of claim 1, wherein the controller changes which of the polarized displays present at least one of the primary operator interface and the primary passenger interface in response to at least one of the operator shifting the operator gaze and the passenger shifting the passenger gaze.

9. The vehicle of claim 1, wherein the controller is configured to:
identify a secondary operator interface and a secondary passenger interface;
present the secondary operator interface to the operator next to the primary operator interface; and
present the secondary passenger interface to the passenger next to the primary passenger interface.

10. The vehicle of claim 9, wherein the secondary operator interface is blank to deter the operator from being distracted.

11. The vehicle of claim 1, wherein the panoramic display is formed by a plurality of monitors arranged in a side-by-side manner and each of the polarized displays corresponds with one of the plurality of monitors.

12. The vehicle of claim 1, wherein the panoramic display is formed by a single monitor that extends along the dashboard and each of the polarized displays corresponds with a respective predefined segment of the single monitor.

13. The vehicle of claim 1, further including a windshield, wherein the panoramic display is an OLED display that extends along the dashboard.

14. The vehicle of claim 1, wherein the controller enables the operator to select the primary operator interface and the passenger to select the primary passenger interface.

15. The vehicle of claim 14, wherein the controller prevents the primary operator interface from being an entertainment interface.

16. The vehicle of claim 14, further including one or more input devices configured to receive selections from the operator and the passenger.

17. The vehicle of claim 14, further including a wireless communication module configured to receive selections of the operator and the passenger from mobile devices.

18. A method for a vehicle, comprising:
identifying, via a processor, a primary driver interface and a primary passenger interface;
detecting, via one or more cameras, a driver gaze and a passenger gaze;
presenting, via one or more of polarized displays, the primary driver interface to a driver corresponding with the driver gaze;
presenting, via one or more of the polarized displays, the primary passenger interface to a passenger corresponding with the passenger gaze; and
wherein each of the polarized displays is configured to simultaneously present a first interface that is viewable from a first relative angle and a second interface that is viewable from a second relative angle.

19. The method of claim 18, furthering including changing which of the polarized displays present at least one of the primary driver interface and the primary passenger interface in response to detecting that at least one of shifting of the driver gaze and shifting of the passenger gaze.

20. A vehicle comprising:
a panoramic display including polarized displays;
a controller to:
identify a primary operator interface and a primary passenger interface;
detect, via one or more cameras, an operator gaze and a passenger gaze;
present the primary operator interface to an operator via one of the polarized displays corresponding with the operator gaze;
present the primary passenger interface to a passenger via one of the polarized displays corresponding with the passenger gaze;
identify a secondary operator interface and a secondary passenger interface;
present the secondary operator interface to the operator next to the primary operator interface;
present the secondary passenger interface to the passenger next to the primary passenger interface; and
wherein the secondary operator interface is blank to deter the operator from being distracted.

* * * * *